United States Patent

[11] 3,596,517

| [72] | Inventor | Frederick L. Ryder |
| | | 50 Harrison Ave., Lynbrook, N.Y. 11563 |
| [21] | Appl. No. | 805,455 |
| [22] | Filed | Mar. 10, 1969 |
| [45] | Patented | Aug. 3, 1971 |

[54] CAPACITANCE-TYPE FLUID MEASURING APPARATUS
4 Claims, 5 Drawing Figs.

[52] U.S. Cl. .................................................. 73/304
[51] Int. Cl. ............................................... G01f 23/26
[50] Field of Search ...................................... 73/304 C

[56] References Cited
UNITED STATES PATENTS
2,981,105  4/1961  Ryder .......................... 73/304 (C)
3,295,372  1/1967  Gronner ....................... 73/304 (C)

Primary Examiner—Louis R. Prince
Assistant Examiner—Frederick Shoon
Attorney—Breitenfeld and Levine ABSTRACT: Measuring apparatus includes measuring condenser immersible in fluid in a container, dielectric constant K and density D of fluid being related by equation:

$$(K-1)/D = A + B(K-1).$$

Electrodes of condenser are spaced and shaped so that dry capacitance of portion of condenser which will be wetted by fluid volume V is a function $g$ of V. Function $G$ is selected so that when multiplied by function of $D$ resulting from solution of above equation for $K-1$, a function results dependent upon value of DV alone, regardless of separate values $D$ and $V$.

PATENTED AUG 3 1971 3,596,517

INVENTOR:
FREDERICK L. RYDER

BY Breitenfeld & Levine
ATTORNEYS

CAPACITANCE-TYPE FLUID MEASURING APPARATUS

The present invention relates to capacitance-type apparatus for measuring fluids having dielectric properties, and particularly to such apparatus for measuring, within prescribed limits of error, the weight or mass of fluid in a container or tank.

The principal element of such apparatus is generally a measuring condenser, having two relatively long and narrow electrodes, and which is arranged in a generally vertical orientation in the tank. The fluid enters the interelectrode space of the condenser up to the height of the fluid surface, thereby displacing air from said space up to said height. Consequently, the dielectric constant of the condenser, for the portion of the electrodes lying below said height, increases from a value of unity, which is the effective dielectric constant of air, to a value K, K being the dielectric constant of the fluid, which is usually substantially greater than unity.

In conventional applications it is customary to characterize the measuring condenser, through the spacing and shaping of its two electrodes, in such a manner that the dry capacitance of the condenser, for that portion of the electrodes lying below any given height H, is proportional to the volume V of the fluid that would exist in the tank if the fluid surface were at height H. In that case the increase in capacitance of the measuring condenser, caused by the introduction of a volume V of fluid into the tank, is proportional to $(K-1)V$. If the fluid properties are such that $K-1$ is proportional to the density $D$ of the fluid in spite of changes in temperature and changes in composition of different batches of the fluid, the increase in capacitance will be proportional to the mass or weight $DV$ of the fluid. This is highly advantageous in the measuring of aircraft fuel, for example, where the available energy of the fuel is known to be closely proportional to its weight regardless of ordinary differences in temperature and in batch composition. Unfortunately, however, it has been found that $K-1$ is not proportional to $D$ within desired limits of error, with the result that certain schemes have been devised for obtaining the mass $DV$ from the capacitance-increase of the measuring condenser in spite of the lack of proportionality between $K-1$ and $D$.

One such scheme, described in U.S. Pat. No. 2,582,399 of Stanley J. Smith, employs conventional characterization of the measuring condenser as described above, and also makes use of the fact that, for aircraft fuels in particular, there has been found to exist, within tolerable limits of error, the following relationship between $K-1$ and $D$:

$$(K-1)/D = A + B(K-1) \quad (1)$$

where $A$ and $B$ are certain constants. Smith effectively applies a voltage of fixed magnitude E to the capacitance-increase $(K-1)V$ of the measuring condenser, thereby obtaining an effective current of magnitude proportional to $E(K-1)V$. He also generates a second voltage of adjustable magnitude $E_x$, and applies it to a so-called compensating condenser and a reference condenser, which are connected in parallel with each other. The compensating condenser, of dry capacitance $C_c$, is installed at the bottom of the tank so that it is always immersed in the fluid, as a result of which its effective capacitance is proportional to the dielectric constant K of the fluid, and the current through it has a magnitude proportional to $E_x K C_c$. The reference condenser, on the other hand, is not in contact with the fluid, so that its capacitance $C_r$ is constant and the current through it has a magnitude proportional to $E_x C_r$. It is readily shown that if $E_x$ is adjusted in magnitude to that value which will cause the sum of the currents through the compensating and reference condensers just to oppose the aforesaid effective current proportional to $E(K-1)V$, and if the ratio of the dry capacitance $C_c$ of the compensating condenser to the capacitance $C_r$ of the reference condenser has a certain value dependent upon the relative values of $A$ and $B$ in Equation (1) above, then the ratio $E_x/E$ will be proportional to $DV$ and will thereby furnish a measurement of the desired mass of the fluid.

A second scheme, described in my U.S. Pat. No. 2,981,105, avoids the use of the compensating condenser, but requires that the measuring condenser be characterized so that the dry capacitance of that portion of the condenser corresponding to a fluid volume V is proportional to $V^n$ rather than to V, where $n$ is a constant, of typical value 1.30. It further requires that Equation (1) be replaced by $$K-1 = CD^n \quad (2)$$

where $C$ is a new constant, and where it may be possible to choose $C$ and $n$ so that Equation (2) will fit conventional aircraft fuels within tolerable limits of error, as does Equation (1). With the new characterization taken into account, the increase in capacitance of the measuring condenser caused by the introduction of a volume V of fluid into the tank is proportional to $(K-1)V^n$, which by Equation (2) is proportional to $D^n V^n$, or $(DV)^n$. The value of said capacitance-increase can be determined in any convenient manner, as for example by using a fixed voltage E, an adjustable voltage $E_x$, and a reference condenser (but not a compensating condenser) in a manner analogous to that used by Smith in the scheme described above. Then, on taking the $n$th root of the capacitance-increase by any effective means, the mass $DV$ is obtained.

Each of the aforesaid two schemes has certain disadvantages, which it is the object of the present invention to overcome. The first scheme, that of Smith, is burdened by the need for an additional element, namely, the compensating condenser, and also by the fact that the location of this element, namely, the bottom of the tank (so that it may always be immersed), is such that the fluid which it senses is likely to be unrepresentative of the fluid in the main body of the tank. This is because foreign matter such as water, which is often present in small quantities in aircraft fuel tanks, tends to concentrate at the bottom of the tank, and also because of stratification effects within the body of fluid; the departure from true representation naturally tends to defeat the purpose of the compensation. The second scheme, described in my aforementioned patent, involves the disadvantage that the accuracy of fit of Equation (2) to conventional aircraft fuels has not been fully tested and is not widely acknowledged. In contrast, Equation (1) has been very fully tested and verified, and has in fact received the formal endorsement of government agencies, concerned with the measurement of aircraft fuel, in a specific form equivalent to the following:

$$(K-1)/D = 0.12913 \cong + .03680(K-1) \quad (3)$$

where $D$ is expressed in pounds per gallon of fluid, and the range of $K-1$ of interest is from 0.850 to 1.270, corresponding to a range of $D$ from 5.299 to 7.221.

The present invention provides a measurement of fluid mass $DV$ without the use of a compensating condenser, and without the need to depart from the widely acknowledged and accepted relationship represented in general form in Equation (1), and in specific form in Equation (3). The manner in which this is accomplished will first be explained briefly, and then in greater detail.

The characterization of the measuring condenser is expressed in the form of a function $g$ of V, or $g(V)$, giving the dry capacitance of that portion of the condenser which, in a given tank, would be wetted by fluid of volume V. The capacitance-increase caused by the actual introduction of this volume of fluid into the tank is then $K-1$ times $g(V)$, or $$(K-1)g(V) \quad (4)$$

corresponding to $(K-1)V$ and $(K-1)V^n$ in the aforesaid schemes of Smith and Ryder, respectively. With $K-1$ expressed as $AD/(1-BD)$ in accordance with Equation (1), wherein $A$ and $B$ are given particular values as for example in Equation (3), then Expression (4) above becomes a new function of $D$ and $V$ alone. The question arises whether there exists a form of $g(V)$ that will make it possible to express the new function of $D$ and $V$ in the form $h(DV)$, that is, as a function $h$ of the product $DV$ alone, regardless of the individual values of $D$ and $V$. If so, and if the form of $h(DV)$ can be determined, then the desired fluid mass $DV$ can be evaluated by applying the inverse of the function $h$ to the measured capacitance-increase of the measuring condenser.

It is possible to show that mathematically exact values of the functions $g(V)$ and $h(DV)$, as defined above, do not exist. This is however of no practical interest, since it has been found that they do in fact exist within highly acceptable limits of error. The determination and resulting forms of these functions, together with data on the errors resulting from their use and with suggested means for incorporating the invention into a practical measuring apparatus, will become apparent from a reading of the following detailed description, reference being made to the accompanying drawings, in which:

Figure 1:
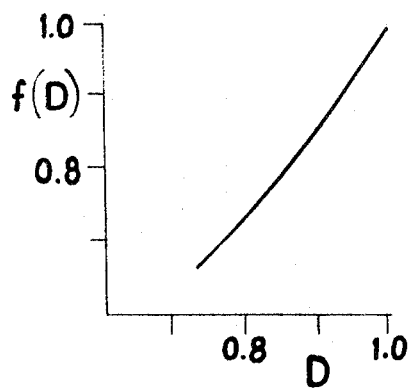
FIG. 1 shows the approximate graph of $K-1$ considered as a function $f$ of fluid density $D$, in the case where the dielectric constant $K$ of the fluid is assumed to be related to $D$ in a certain specified manner.

Referring to FIG. 1, $D$ is the fluid density, and it is assumed that the quantity $K-1$, where $K$ is the dielectric constant of the fluid, can be represented as proportional to a function $f$ of $D$, or $f(D)$, in a manner consistent with Equation (1). For the sake of convenience of numerical illustration the following further assumptions have been incorporated in FIG. 1: the particularization given by (3) is in effect, with $D$ ranging from 5.299 to 7.221 pounds per gallon as given previously; the unit of density is increased by the factor 7.221, in which case the maximum density becomes unity; and the constant of proportionality relating $K-1$ to $f(D)$ is made such that the maximum value of $f(d)$, which now occurs when $D$ is unity, becomes unity itself. With these stipulations Equation (3) can be arranged to yield:

$$f(D) = 0.7343D/(1-0.2657D) \quad (5)$$

which has a minimum value of 0.6693 when $D$ has its minimum value, which is 0.7338 in the present units. It is to be understood that FIG. 1 shows the above relationship only as an aid to visualization, and is not to be used for precise numerical values.

It is now required to determine a suitable form for the characterization function $g(V)$ in Expression (4), said function having been defined as the dry capacitance of that portion of the measuring condenser which, in a given tank, would be wetted by fluid of volume $V$. In view of the discussion given in connection with FIG. 1, $K-1$ in Expression (4) can be replaced (except for a constant of proportionality) by $f(D)$. Then Expression (4), which represents the capacitance-increase of the measuring condenser caused by the introduction of fluid of volume $V$ into the tank, can be rewritten as the left side of the following equation:

$$f(D)g(V)h(DV) \quad (6)$$

where the right side implies that, with $f(D)$ given by FIG. 1 and Equation (5), $g(V)$ must be such that the product of the functions $f$ and $g$ yields, within tolerable limits of error, a function $h$ of the product $DV$, regardless of the individual values of $D$ and $V$.

Figure 2:
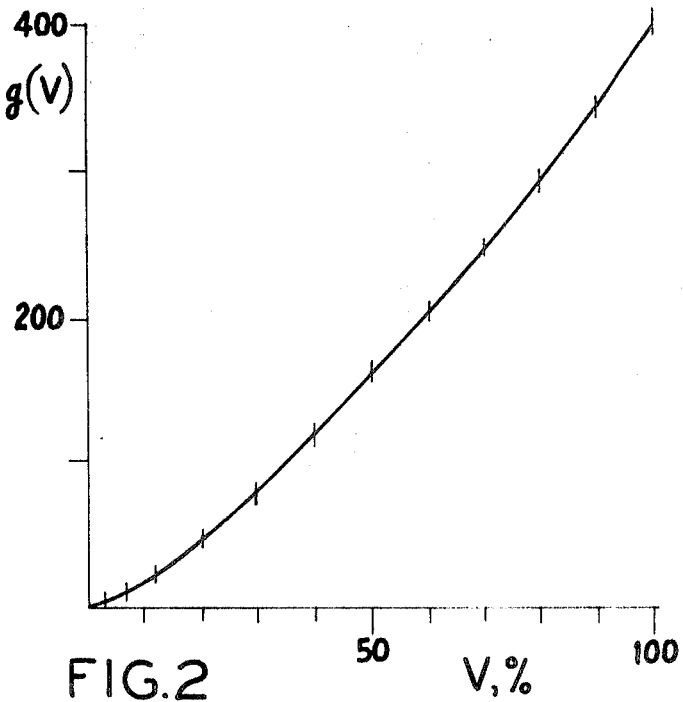
FIG. 2 shows the approximate graph of the characterization of the dry capacitance of a measuring condenser, expressed as a function $g$ of fluid volume $V$, appropriate for use in connection with the specified relationship of FIG. 1.

The problem of finding a satisfactory function $g(V)$ is a purely mathematical one, which can be dealt with in various ways as discussed in available literature on the fitting of functions. The particular method chosen here for purposes of convenience is to express $g(V)$ as a broken line function of $V$, as illustrated in FIG. 2. By successive trials, a range of $V$ is determined for each straight line segment, together with end-point values of $g(V)$ for that segment, such as to satisfy the stated requirement over the range of $D$ given in connection with FIG. 1 and Equation (5). The results, with $V$ expressed as a percentage of the full tank volume and with $g(V)$ expressed in terms of arbitrary units of capacitance, are indicated approximately in FIG. 2 and are expressed precisely by the following sets of end points for the successive straight line segments:

| $V$, $g(V)$: | 0.0, | 0.00 | 30.0, | 82.98 | 80.0, | 297.76 |
|---|---|---|---|---|---|---|
| | 2.0, | 2.30 | 40.0, | 120.78 | 90.0, | 347.04 |
| | 6.0, | 10.10 | 50.0, | 161.52 | 100.0, | 398.00 |
| | 12.0, | 25.10 | 60.0, | 204.80 | | |
| | 20.0, | 48.88 | 70.0, | 250.28 | | (7) |

With $g(V)$ given by the above listing, and with $f(D)$ given by FIG. 1 and Equation (5), it is next required to find a form of $h(DV)$ that will yield adequately close satisfaction of Equation (6). The determination of $h(DV)$ has been carried out by the same general technique as described above for the determination of $g(V)$, resulting in the following sets of end-points for successive straight-line segments:

| $DV$, $h(DV)$: | 0.0, | 0.0 | 30.0, | 82.7 | 80.0, | 297.3 |
|---|---|---|---|---|---|---|
| | 2.0, | 2.2 | 40.0, | 120.5 | 90.0, | 346.5 |
| | 6.0, | 10.0 | 50.0, | 161.2 | 100.0, | 397.4 |
| | 12.0, | 25.0 | 60.0, | 204.5 | | |
| | 20.0, | 48.7 | 70.0, | 249.9 | | (8) | where, since the maximum values of $D$ and $V$ are unity and 100 percent respectively, $DV$ is given as a percentage of its maximum value. It is readily observed that Listing (8) is almost, but not quite, identical to Listing (7), so that the approximate graph of FIG. 2 may serve for Listing (8) if $V$ and $g(V)$ are replaced by $DV$ and $h(DV)$ respectively.

Figure 3:
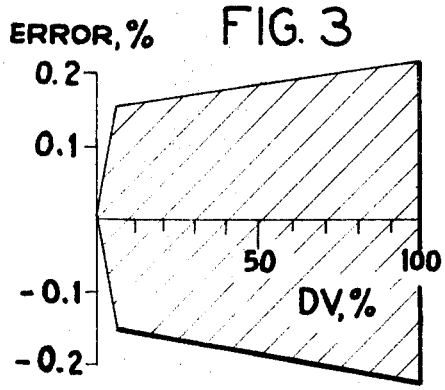
FIG. 3 shows a plot of the range of errors which result from the combined use of the plots of FIGS. 1 and 2 in accordance with the present invention.

The accuracy with which the above results satisfy Equation (6), which is a matter of practical importance, may be checked for particular values of $D$ and $V$ in the following illustrative manner. Let $D$ equal 0.8, for example, so that, by Equation (5), $f(D)$ equals 0.7460. Let $V$ be 85 percent, say, so that $DV=0.8\times85=68.0$ percent and, by interpolation in Listing (7), $g(V)=322.4$. Then, by Equation (6), $h=0.7460\times322.4=240.5$, which yields, by interpolation in Listing (8), $DV=67.93$ percent. The resulting discrepancy between this value and the corresponding true value previously obtained by multiplying the individual values of $D$ and $V$, namely 68.0 percent, is only 0.07 percent. The corresponding errors for other values of $D$ and $V$ have been investigated very fully, with a resulting error-band as shown in FIG. 3, where the abscissa is conveniently chosen as $DV$. The maximum error, namely 0.22 percent, is of the order of one-tenth the error that must commonly be accepted, for reasons not connected with the present invention, in capacitance-type fluid measuring devices, and is therefore insignificant.

Figure 4:
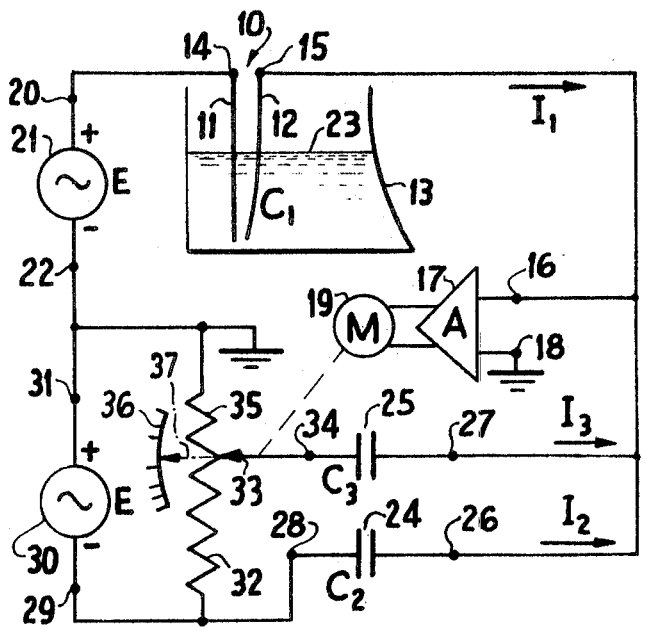
FIG. 4 is a diagram of a typical circuit incorporating the invention, simplified for ease of explanation.

FIG. 4 shows the essential elements of a typical circuit for utilizing the present invention. A measuring condenser 10, with relatively long and narrow electrodes 11 and 12, is positioned in a generally vertical orientation in a tank 13, which may be irregular in shape as indicated. The measuring condenser may consist of a plurality of separate two-electrode condensers connected in parallel with terminals 14 and 15, so that the total capacitance measured between the terminals is the sum of the capacitances of the separate condensers.

Terminal 15 is connected to one input terminal 16 of an amplifier 17, the other input terminal 18 being connected to a point which is at some datum voltage, arbitrarily considered to be zero voltage and therefore conveniently designated as ground. The gain of amplifier 17 is assumed to be sufficiently high so that motor 19, which receives the output of the amplifier, will be at rest only if the voltage difference between the input terminals 16 and 18 is very close to zero. It will presently become apparent that this is the condition of primary interest in this description, so that terminal 16, and consequently terminal 15 of measuring condenser 10, can be considered to be virtually at ground potential. The other terminal 14 of measuring condenser 10 is connected to output terminal 20 of AC generator 21, the other terminal 22 of which is connected to the same electrical ground as input terminal 18 of amplifier 17. The output voltage $E$ of generator 21 acts on measuring condenser 10 to produce a current $I_1$ which, in appropriate units dependent upon the AC frequency, equals the product of $E$ and the capacitance $C_1$ of the condenser, where:

$$C_1 = C_0 + (K-1)g(V) \quad (9)$$

in which $C_o$ is the capacitance of measuring condenser 10 in the absence of fluid; and $(K-1)g(V)$ is, as explained in connection with Expression (4), the increase in capacitance caused by the introduction into the tank of a volume V of fluid, whose surface 23 is shown inside tank 13 of FIG. 4. Hence:

$$I_1 = E(C_o + (K-1)g(V)) \quad (10)$$

Next consider zeroing condenser 24 and scaling condenser 25, so called for reasons which will presently become apparent. These condensers are not within tank 13, so that their capacitances, designated as $C_2$ and $C_3$ respectively, are not affected by the presence of fluid. Terminals 26 and 27 of these condensers are connected to input terminal 16 of amplifier 17 and are therefore at virtually zero voltage, for reasons explained above. Terminal 28 of zeroing condenser 24 is connected to output terminal 29 of AC generator 30, the other terminal 31 of which is connected to the same ground previously designated. The output of generator 30 is a voltage which has the same magnitude, namely E, as the output of generator 21, the two voltages being related in phase in the manner indicated by the plus and minus signs associated with generators 21 and 30. The overall effect of the generators is, incidentally, identical to the effect of a center-grounded secondary of a transformer whose primary is fed by an AC voltage. The resulting current $I_2$ through the capacitance $C_2$ of zeroing condenser 24 is as follows, in the same units as used in Equation (10):

$$I_2 = -EC_2. \quad (11)$$

To determine $I_3$, the current through capacitance $C_3$ of scaling condenser 25, reference is made to potentiometer 32, which is connected between ground and the output terminal 29 of generator 30 so that the total voltage across it is E. Wiper 33 of this potentiometer is connected to terminal 34 of condenser 25 and is positioned by motor 19, which is in turn energized by the output of amplifier 17. The fractional electrical travel of the wiper, defined as the ratio of the potentiometer resistance 35 located between ground and the wiper 33, to the total potentiometer resistance, will be designated y, and it will be assumed that the total potentiometer resistance is sufficiently small so that the passage of current $I_3$ through any portion of the potentiometer does not produce appreciable voltage drop. Consequently, the magnitude of the voltage at wiper 33 is yE and, by analogy to Equations (10) and (11), there is obtained:

$$I_3 = -yEC_3 \quad (12)$$

By inspection of FIG. 4, the total current entering amplifier 17 through input terminal 16 is the resultant of the currents $I_1$, $I_2$ and $I_3$. But since the voltage at terminal 16 has been shown to be virtually zero, and since the input impedance of the amplifier is assumed to be rather high as in normal practice, the resultant current is virtually zero. Accordingly, the sum of the right-hand sides of Equations (10), (11) and (12) can be equated to zero, and on dividing through the resulting equation by E there results:

$$C_o + (K-1)g(V) - C_2 - yC_3 = 0 \quad (13)$$

In order to achieve the zeroing function of condenser 24, $C_2$ is made equal to the total dry capacitance $C_o$ of measuring condenser 10, in which case the above expression may be written:

$$yC_3 = (K-1)g(V) \quad (14)$$

Hence y, the fractional electrical travel of wiper 33 of potentiometer 32, is zero when the tank is empty, since the characterization capacitance $g(V)$ is inherently zero when the fluid volume V is zero. In order to achieve the scaling function of condenser 25, the value of $C_3$ is made such that y is substantially unity when the tank is full (in which case V, and consequently $g(V)$, are at their maximum values) and $K-1$ has its maximum expected value.

If, contrary to conditions assumed above, the position of wiper 33 is such that the voltage difference between input terminals 16 and 18 of amplifier 17 is appreciably different from zero, then, because of the high gain of the amplifier, motor 19 will turn. As a result, the mechanical position of wiper 33 is adjusted, and consequently the fractional electrical travel y, in a direction to reduce said voltage difference to a very small value as in normal servo practice, thereby restoring the conditions under which Equation (14) has been derived.

In Equation (14), $K-1$ can be replaced (except for a constant of proportionality) by $f(D)$, which in the present illustrative case is given by Equation (5). If, further, $g(V)$ is represented by FIG. 2 and Listing (7), then the right-hand side of Equation (14) can be effectively replaced by $h(DV)$ as in Equation (6), with $h(DV)$ given by Listing (8) as discussed above. In that case:

$$Y :: h(DV) \quad (15)$$

where the double colon indicates proportionality. Hence the fluid weight DV can be determined by applying the inverse of function h to some constant times the fractional electrical travel y. Illustrative means for carrying this out will now be described.

There may be mechanically attached to wiper 33, in FIG. 4, an indicator needle 37 which reads against a fixed scale 36, the latter being marked in appropriate units of fluid weight DV. For any value of y, with its associated value of DV according to Equation (15), there will be a definite mechanical position of wiper 33 and hence of the needle attached thereto, this position being dependent upon the characterization of potentiometer 32 which determines the relationship between the electrical travel and the mechanical position of wiper 33. No matter what this characterization may be, the divisions in the scale 36 can be spaced so that, for any value of y, the value of DV indicated by the needle 37 will correspond to the value implicit in Equation (15), thereby yielding a correct indication (within the limits of error discussed in connection with FIG. 3) of fluid weight. In the particular case of a potentiometer characterization such that y is the aforesaid function h of the mechanical position of wiper 33, then the scale 36 becomes linear, and said mechanical position can itself be used as a proportional indication of fluid weight.

Figure 5:
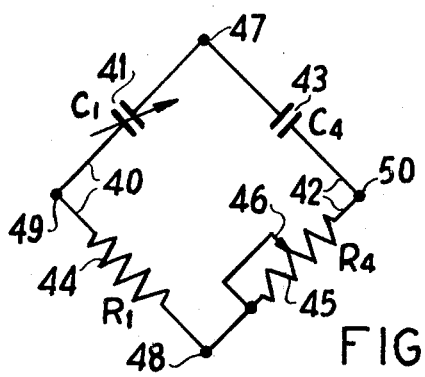
FIG. 5 shows the essential elements of an alternative circuit suitable for carrying out the invention.

Another circuit which is suitable for carrying out the present invention is shown in FIG. 5. This circuit is derived from an ordinary four-resistor Wheatstone bridge by replacing one of the two resistors in the first leg 40 of the bridge by condenser 41, which is identical to measuring condenser 10 in FIG. 4 and which therefore has the variable capacitance $C_1$ dependent on the volume of fluid in the tank; and by replacing the opposing resistor in the second leg 42 of the bridge by a new condenser 43, which has the constant capacitance $C_4$. The remaining bridge resistances 44 and 45, which are in series with $C_1$ and $C_4$ respectively, are given the designated values $R_1$ and $R_4$, where $R_1$ is constant and $R_4$ is the variable resistance of a rheostat as determined by the position of the rheostat wiper 46. With the bridge energized by an AC voltage applied between the two common ends 47 and 48 of the two legs, it is readily shown that the output of the bridge, which is the voltage difference between terminals 49 and 50, will be zero, indicating a state of balance, if $$R_4 C_4 = R_1 C_1 \quad (16)$$

If the bridge is not in balance then its output will not be zero, and can be used to vary the position of wiper 46 in a direction to restore balance, by applying it to the input of an amplifier such as 17 in FIG. 4, which drives a motor such as 19, which in turn positions wiper 46 so as to bring the value of $R_4$ into conformance with Equation (16).

The variable $R_4$ can be expressed as the sum of a fixed value $R_o$, corresponding to a definite minimum position of the rheostat wiper 46, and a variable Z dependent on the movement of the wiper from said minimum position, and part or all of $R_o$ may be placed outside rheostat 45 in the form of a fixed resistance in series with the rheostat. In any case, Equation (16) can then be written as follows:

$$(R_o + Z)C_4 = R_1(C_o + (K-1)g(V)) \quad (17)$$

where use has been made of Equation (9). Now $R_o$ can be regarded as a zeroing resistance, analogous to the zeroing capacitance $C_2$ in FIG. 4 and Equation (13), and by choosing an appropriate value for it we reduce the above equation to:

$$ZC_4/R_1 = (K-1)g(V) \quad (18)$$

Thus in the present circuit the movement of rheostat wiper 46, which governs the value of $Z$, is a measure of the capacitance-increase of the measuring condenser, in the same way that the potentiometer wiper movement $y$ in Equation (14) provides such a measure. The value of $C_4/R_1$ above can be chosen so that $Z$ has the maximum value obtainable from the rheostat when said capacitance-increase is at its maximum; thus $C_4$ and $R_1$ are scaling elements, corresponding to scaling capacitance $C_3$ in FIG. 4 and Equation (14). An indication of fluid weight can be provided by mechanically attaching to wiper 46 a needle, similar to needle 37 attached to wiper 33 in FIG. 4, said needle acting against a scale similar to scale 36 in FIG. 4, with divisions marked in units of fluid weight, and with spacing of the divisions dependent on the electrical-versus-mechanical characterization of rheostat 45 in the same manner that the spacing of the divisions of scale 36 depends on the characterization of potentiometer 32 in FIG. 4.

As a variation of the circuit of FIG. 5, the variable $R_4$ may be made a constant, and $C_4$ may be made variable with its value dependent on the positioning of a set of movable plates as in conventional variable condensers. As described for $R_4$ in the case above, $C_4$ should in the present case include a fixed value so chosen that the bridge will be balanced when the tank is empty and $C_1$ is at its minimum value of $C_0$. The indicating needle, corresponding to needle 37 in FIG. 4, would now be attached to the movable plates of condenser $C_4$, and the scale, corresponding to scale 36 in FIG. 4, would have the spacing of its divisions dependent on the electrical-versus-mechanical characterization of condenser $C_4$.

Still other suitable circuits can be devised, by those skilled in the subject art, without departing from the purview of the present invention.

What I claim is:

1. Capacitance-type apparatus for measuring the mass of dielectric fluid in a container when, for the range of fluids being measured, the dielectric constant $K$ and the density $D$ of the fluid are related, within tolerable limits of error, by the equation $$(K-1)/D = A + B(K-1)$$

Where $A$ and $B$ are constants, comprising in combination:
 a measuring condenser having electrodes immersible in the fluid in the container, said electrodes being spaced and shaped so that the dry capacitance of that portion of the condenser which would be wetted by fluid of volume $V$ is $g(V)$, the latter being a function of $V$ which satisfies, within tolerable error, the equation
 $g(V)f(D)=h(DV)$ where $f(D)$ is obtained by solving the equation mentioned first above for $K-1$, and $h(DV)$ is a function whose value is dependent on the value of $DV$ alone;
 means connecting said measuring condenser in a first circuit for producing a current therein having a first component proportional to the capacitance of said condenser in the absence of fluid in the container, and a second component proportional to the increase in capacitance of said measuring condenser caused by the presence of fluid in the container;
 a second circuit including means for producing therein a third component of current having a magnitude equal to said first component, and means for producing therein a variable component of current;
 balancing means coupled to both said first and second circuits responsive to any inequality between the sum of said first and second components and the sum of said third and variable components of current for adjusting said variable component in a direction to reduce said inequality to zero; and
 means coupled to said balancing means responsive to the adjustment of said variable component for providing an indication proportional to the inverse of said function $h$ of the amount of said adjustment, whereby said indication represents the mass of fluid in the container.

2. Capacitance-type fluid measuring apparatus as defined in claim 1, wherein $A=0.12913$, $B=.03680$, and $D$ is measured in pounds per gallon of fluid.

3. Capacitance-type fluid measuring apparatus as defined in claim 1, including means for applying a first fixed AC voltage to said first circuit; and means for applying a second fixed AC voltage to said second circuit, said second voltage being of phase opposite to that of said first voltage; and wherein said second circuit has a fixed value of capacitance such that its current is equal in magnitude to that which would flow through said measuring condenser in the absence of fluid, a potentiometer arranged to receive said second voltage, and a scaling condenser of fixed capacitance arranged to receive the voltage at the wiper of said potentiometer; and said balancing means comprises a motor energized by the resultant of the currents through said first and second circuits for adjusting the position of the potentiometer wiper, the direction of said adjustment being that which tends to reduce said resultant current to zero; the capacitance of said scaling condenser being such as to match the travel of the potentiometer wiper to the range of capacitance increase of said measuring condenser caused by the presence of fluid; and said coupled means comprises an indicator mechanically coupled to said potentiometer wiper and cooperating with a fixed scale calibrated in units of fluid mass, the divisions of said scale being so spaced that, for the position of said wiper corresponding to any given wiper voltage, as determined by the mechanical-versus-electrical characterization of the potentiometer, said indicator indicates the inverse of said function $h$ of said wiper voltage, thereby providing an indication of fluid mass.

4. Capacitance-type fluid measuring apparatus as defined in claim 1 including a bridge; the first leg of said bridge being formed by a first resistance of constant value in series with said measuring condenser; and the second leg of said bridge including a second condenser of fixed capacitance opposite to said measuring condenser and a rheostat opposite to said first resistance, the resistance of said rheostat being determined by the position of its wiper; means for applying an AC voltage between the upper and lower junctions of said bridge legs; and wherein said second circuit comprises the portion of said rheostat resistance corresponding to a minimum position of the rheostat wiper, said rheostat portion having a value which would balance said bridge in the absence of fluid; said balancing means comprises the portion of said rheostat resistance which increases in value by motion of the rheostat wiper; a motor energized in response to the output voltage of said bridge for adjusting the position of the rheostat wiper, the direction of said adjustment being that which tends to reduce the bridge output to zero; the values of said second capacitance and first resistance being such as to match the range of wiper movement to the range of capacitance-increase caused by the presence of fluid; and said coupled means comprises an indicator mechanically coupled to said rheostat wiper and cooperating with a fixed scale calibrated in units of fluid mass, the divisions of said scale being so spaced that, for the position of said wiper corresponding to any given rheostat resistance, as determined by the mechanical-versus-electrical characterization of the rheostat, said indicator indicates the inverse of said function $h$ of said increase in rheostat resistance caused by wiper movement, thereby providing an indication of fluid mass.